US011443163B2

(12) United States Patent
Qin et al.

(10) Patent No.: US 11,443,163 B2
(45) Date of Patent: Sep. 13, 2022

(54) METHOD AND SYSTEM FOR EXECUTING NEURAL NETWORK

(71) Applicant: ALIBABA GROUP HOLDING LIMITED, Grand Cayman (KY)

(72) Inventors: Minghai Qin, San Mateo, CA (US); Chunsheng Liu, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 522 days.

(21) Appl. No.: 16/600,299

(22) Filed: Oct. 11, 2019

(65) Prior Publication Data
US 2021/0110234 A1    Apr. 15, 2021

(51) Int. Cl.
*G06N 3/04* (2006.01)

(52) U.S. Cl.
CPC ...................................... *G06N 3/04* (2013.01)

(58) Field of Classification Search
CPC ....... G06N 3/04; G06N 3/0454; G06N 3/0481
See application file for complete search history.

(56) References Cited

U.S. PATENT DOCUMENTS

| 10,325,315 | B1 * | 6/2019 | Tang | ........................ G06N 3/04 |
| 2010/0324848 | A1 | 12/2010 | Cho et al. | |
| 2018/0046907 | A1 | 2/2018 | Ross et al. | |
| 2019/0354862 | A1 | 11/2019 | Ross et al. | |
| 2019/0378001 | A1 * | 12/2019 | Litvak | ................... G06F 9/5044 |
| 2022/0138581 | A1 * | 5/2022 | Baker | ................. G06K 9/6227 706/12 |

OTHER PUBLICATIONS

International Search Report and Written Opinion of the International Searching Authority dated Nov. 19, 2020, in the corresponding PCT International Application No. PCT/US2020/054764. (7 pages).
Hayek et al. "Improved Cardinality Estimation by Leaning Queries Containment Rates", arXiv:1908.07723v1 [cs.DB] Aug. 21, 2019. Retrieved on Dec. 13, 2020. Retrieved from <URL: https://arxiv.org/pdf/1908.07723.pdf>.
Yao et al. "FastDeepIoT: Towards Understanding and Optimizing Neural Network Execution Time on Mobile and Embedded Devices", ACM, SenSys '18, Nov. 4-7, 2018. Retrieved on Dec. 12, 2020. Retrieved from <URL: https://dl.acm.org/doi/pdf/10.1145/3274783.3274840>.

* cited by examiner

*Primary Examiner* — Anner N Holder
(74) *Attorney, Agent, or Firm* — Finnegan, Henderson, Farabow, Garrett & Dunner, LLP

(57) ABSTRACT

The present disclosure provides methods and systems for executing a neural network. The method includes: receiving a plurality of input vectors of input data; generating, among the plurality of input vectors, an estimation value associated with a subset of an input vector based on a weight vector of the activation function; determining whether the estimation value associated with the subset of the input vector satisfies a threshold condition; and determining an output of the activation function based on the estimation value.

20 Claims, 7 Drawing Sheets

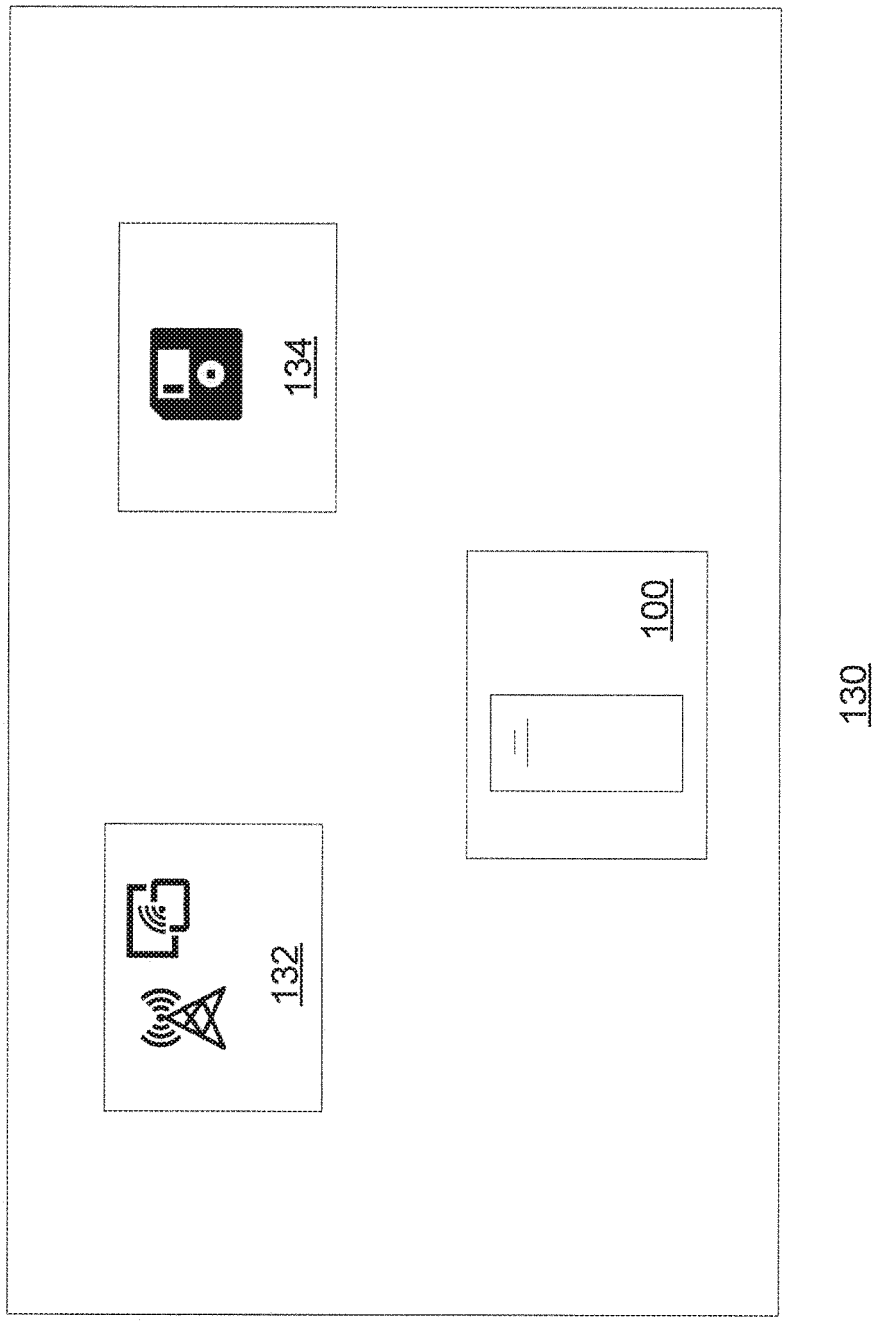

METHOD AND SYSTEM FOR EXECUTING NEURAL NETWORK

BACKGROUND

Neural networks have become standard machine learning tools to solve a variety of problems, such as computer vision and automatic speech recognition processing. However, neural networks require an extensive amount of computations to be performed, which lays burden on the power consumption and computation resources of computing devices.

For some computing devices, such as Internet of Things (IoT) devices, wearable devices, and mobile devices, power and computation resources are limited. Therefore, executing neural networks on these devices in an efficient manner can be a challenge.

SUMMARY OF THE DISCLOSURE

Embodiments of the disclosure provide a computer-implemented method for executing an activation function of a neural network. The method can include: receiving a plurality of input vectors of input data; generating, among the plurality of input vectors, an estimation value associated with a subset of an input vector based on a weight vector of the activation function; determining whether the estimation value associated with the subset of the input vector satisfies a threshold condition; and determining an output of the activation function based on the estimation value.

Embodiments of the disclosure also provide a system for executing a neural network. The system can include a memory storing a set of instructions; and at least one processor configured to execute the set of instructions to cause the system to perform: receiving a plurality of input vectors of input data; generating, among the plurality of input vectors, an estimation value associated with a subset of an input vector based on a weight vector of the activation function; determining whether the estimation value associated with the subset of the input vector satisfies a threshold condition; and determining an output of the activation function based on the estimation value.

Embodiments of the disclosure further provide a non-transitory computer readable medium that stores a set of instructions that is executable by at least one processor of a computer system to cause the computer system to perform a method for executing an activation function of a neural network. The method can include: receiving a plurality of input vectors of input data; generating, among the plurality of input vectors, an estimation value associated with a subset of an input vector based on a weight vector of the activation function; determining whether the estimation value associated with the subset of the input vector satisfies a threshold condition; and determining an output of the activation function based on the estimation value.

BRIEF DESCRIPTION OF THE DRAWINGS

Embodiments and various aspects of the present disclosure are illustrated in the following detailed description and the accompanying figures. Various features shown in the figures are not drawn to scale.

FIG. 1B illustrates a schematic diagram of an exemplary device incorporating the parallel computing architecture, according to some embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Many chipsets incorporating artificial intelligence technologies (AI chipsets) use deep neural networks (DNN) as inference engines. The most common operations in DNN involve vector-vector multiplication (VMM), which requires N multiplications and N−1 additions between two vectors of length N. The results of the VMM is usually passed through a function called a rectified linear unit (ReLu), where a negative input to the ReLu is set to 0 and a positive input stays unchanged. Therefore, if two vectors have a VMM result as being negative, the multiplications and additions have no effect on the final inference result. Accordingly, the power consumption and computation resources of computing devices have been wasted.

The disclosed embodiments can involve estimating the results of a VMM. By generating an estimation value associated with a subset of an input vector of a neural network and generating an output of an activation function of the neural network based on the estimation value, computation resources required for the neural network can be reduced. Thus, the neural network according to embodiments of the disclosure can be deployed to devices with limited computation resources.

Figure 1A:
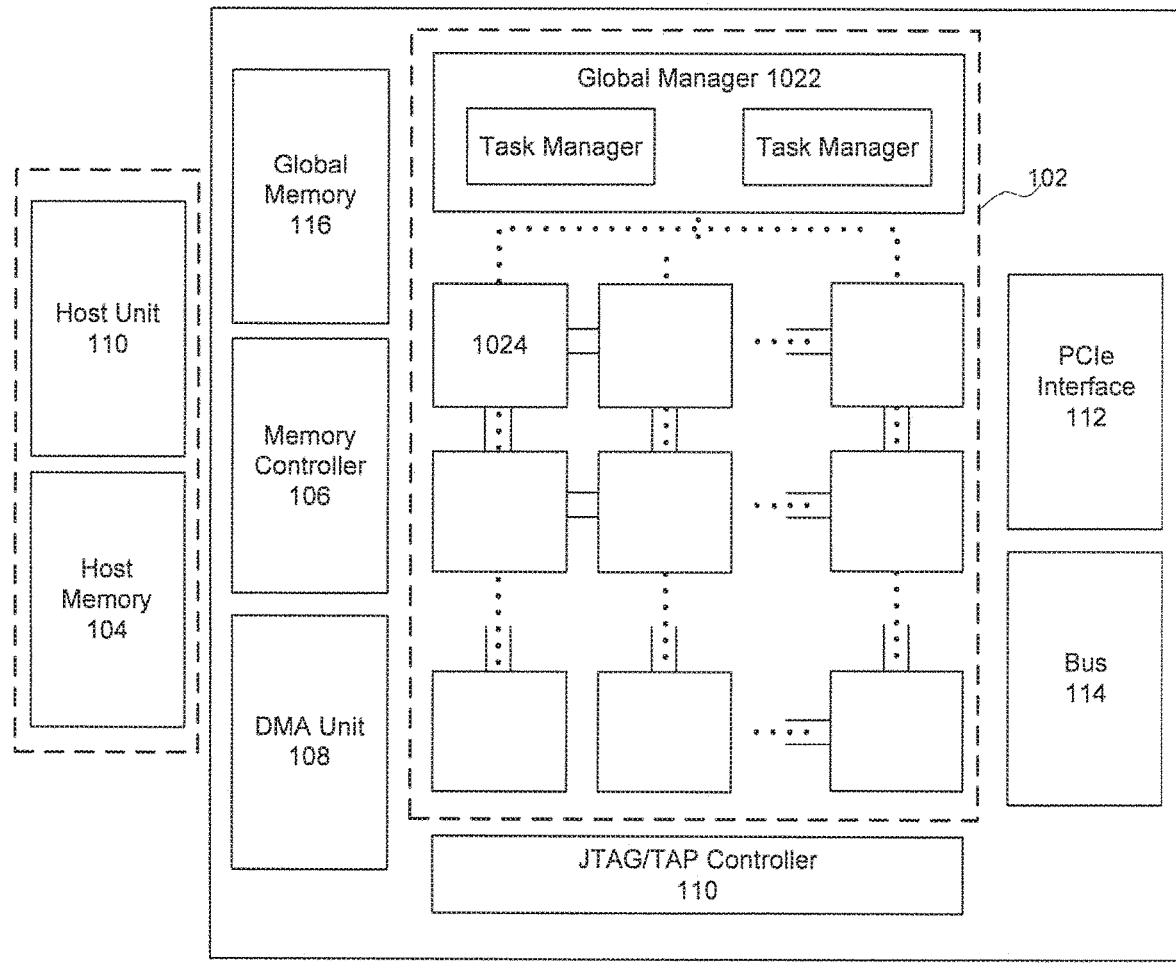
FIG. 1A illustrates an exemplary parallel computing architecture, according to some embodiments of the disclosure.

FIG. 1A illustrates an exemplary parallel computing architecture 100, according to embodiments of the disclosure. As shown in FIG. 1A, architecture 100 can include at least one of a chip communication system 102, a host memory 104, a memory controller 106, a direct memory access (DMA) unit 108, a Joint Test Action Group (JTAG)/Test Access End (TAP) controller 110, a peripheral interface 112, a bus 114, a global memory 116, and the like. It is appreciated that, chip communication system 102 can perform algorithmic operations (e.g., machine learning operations) based on communicated data.

Chip communication system 102 can include a global manager 1022 and a plurality of cores 1024. Global manager 1022 can include at least one task manager to coordinate with one or more cores 1024. Each task manager can be associated with an array of cores 1024 that provide synapse/neuron circuitry for parallel computation (e.g., the neural network). For example, the top layer of processing elements of FIG. 1A may provide circuitry representing an input layer to a neural network, while the second layer of cores may provide circuitry representing a hidden layer of the neural network. In some embodiments, chip communication system 102 can be implemented as a neural network processing unit (NPU), a graphic processing unit (GPU), or another heterogeneous accelerator unit. As shown in FIG. 1A, global manager 1022 can include two task managers to coordinate with two arrays of cores.

Cores 1024, for example, can include one or more processing elements that each include single instruction, multiple data (SIMD) architecture including one or more processing units configured to perform one or more operations (e.g., multiplication, addition, multiply-accumulate, etc.) based on instructions received from global manager 1022. To perform the operation on the communicated data packets, cores 1024 can include one or more processing elements for processing information in the data packets. Each processing element may comprise any number of processing units. In some embodiments, core 1024 can be considered a tile or the like.

Host memory 104 can be off-chip memory such as a host CPU's memory. For example, host memory 104 can be a DDR memory (e.g., DDR SDRAM) or the like. Host memory 104 can be configured to store a large amount of data with slower access speed, compared to the on-chip memory integrated within one or more processors, acting as a higher-level cache.

Memory controller 106 can manage the reading and writing of data to and from a specific memory block within global memory 116 having on-chip memory blocks (e.g., 4 blocks of 8 GB second generation of high bandwidth memory (HBM2)) to serve as main memory. For example, memory controller 106 can manage read/write data coming from outside chip communication system 102 (e.g., from DMA unit 108 or a DMA unit corresponding with another NPU) or from inside chip communication system 102 (e.g., from a local memory in core 1024 via a 2D mesh controlled by a task manager of global manager 1022). Moreover, while one memory controller is shown in FIG. 1A, it is appreciated that more than one memory controller can be provided in architecture 100. For example, there can be one memory controller for each memory block (e.g., HBM2) within global memory 116.

Memory controller 106 can generate memory addresses and initiate memory read or write cycles. Memory controller 106 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 108 can assist with transferring data between host memory 104 and global memory 116. In addition, DMA unit 108 can assist with transferring data between multiple NPUs (e.g., NPU 102). DMA unit 108 can allow off-chip devices to access both on-chip and off-chip memory without causing a CPU interrupt. Thus, DMA unit 108 can also generate memory addresses and initiate memory read or write cycles. DMA unit 108 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that architecture 100 can include a second DMA unit, which can be used to transfer data between other neural network processing architectures to allow multiple neural network processing architectures to communication directly without involving the host CPU.

JTAG/TAP controller 110 can specify a dedicated debug port implementing a serial communications interface (e.g., a JTAG interface) for low-overhead access to the NPU without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an (and typically the) inter-chip bus, providing communication between architecture 100 and other devices.

Bus 114 includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

Chip communication system 102 can be configured to perform operations based on neural networks.

Architecture 100 can also include a host unit 120. Host unit 120 can be one or more processing unit (e.g., an ARM central processing unit). In some embodiments, a host system having host unit 120 and host memory 104 can comprise a compiler (not shown). The compiler is a program or computer software that transforms computer codes written in one programming language into instructions for chip communication system 102 to create an executable program. In machine learning applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler that generates the instructions can be on the host system, which pushes commands to chip communication system 102. Based on these commands, each task manager can assign any number of tasks to one or more cores (e.g., core 1024). Some of the commands can instruct DMA unit 108 to load the instructions (generated by the compiler) and data from host memory 104 into global memory 116. The loaded instructions can then be distributed to each core assigned with the corresponding task, and the one or more cores can process these instructions.

FIG. 1B illustrates a schematic diagram of an exemplary IoT device 130 incorporating architecture 100, according to some embodiments of the disclosure.

Device 130 can include at least one networked sensor 132, a memory 134 for storing data (e.g., sensed data), and parallel computing architecture 100. With the assistance of parallel computing architecture 100, device 130 can provide the extended AI capabilities based on the sensed data, such as image recognition, facial recognition, translations, 3D modeling, and the like.

It is appreciated that, parallel computing architecture 100 can be deployed to computing devices in other forms. For example, architecture 100 can also be integrated in a computing device, such as a smart phone, a tablet, a wearable device, an edge device, or a server.

Moreover, while a parallel computing architecture is shown in FIGS. 1A-1B, it is appreciated that any accelerator that provides the ability to perform parallel computation can be used.

To execute a neural network by, e.g., architecture 100, vector-vector multiplication is necessary for processing input data. For example, in a convolutional neural network (CNN), vector-vector multiplication can be performed as part of the convolutional computation. Also for example, in a deep neural network (DNN), vector-vector multiplication can be performed on an input vector and a weight vector to generate a dot product, which can be sent to rectifier (e.g., a ReLu) to generate an output. In some embodiments, the output can be used as an input for a next layer. It is appreciated that a rectified linear unit can also be applied for a convolutional neural network.

For example, in a convolutional neural network, an activation function can take a feature map generated by a convolutional layer and create an activation map as its output for a next layer. The activation function can be an element-wise operation over the feature map and therefore the dimensions of the feature map and the output are identical.

A rectifier in the convolutional neural network can perform element-wise absolute value operation on the feature map. The rectifier can eliminate cancellation effects in subsequent layers and propagate the gradient efficiently. Therefore, the rectifier can functions similarly to eliminate cancellation effects in a deep neural network, so as to reduce the likelihood of a vanishing gradient problem.

In neural networks, performing vector-vector multiplication to generate a dot product of an input vector and a weight vector and pass the dot product through the rectifier to generate an output can be referred to as an activation function.

Figure 2:
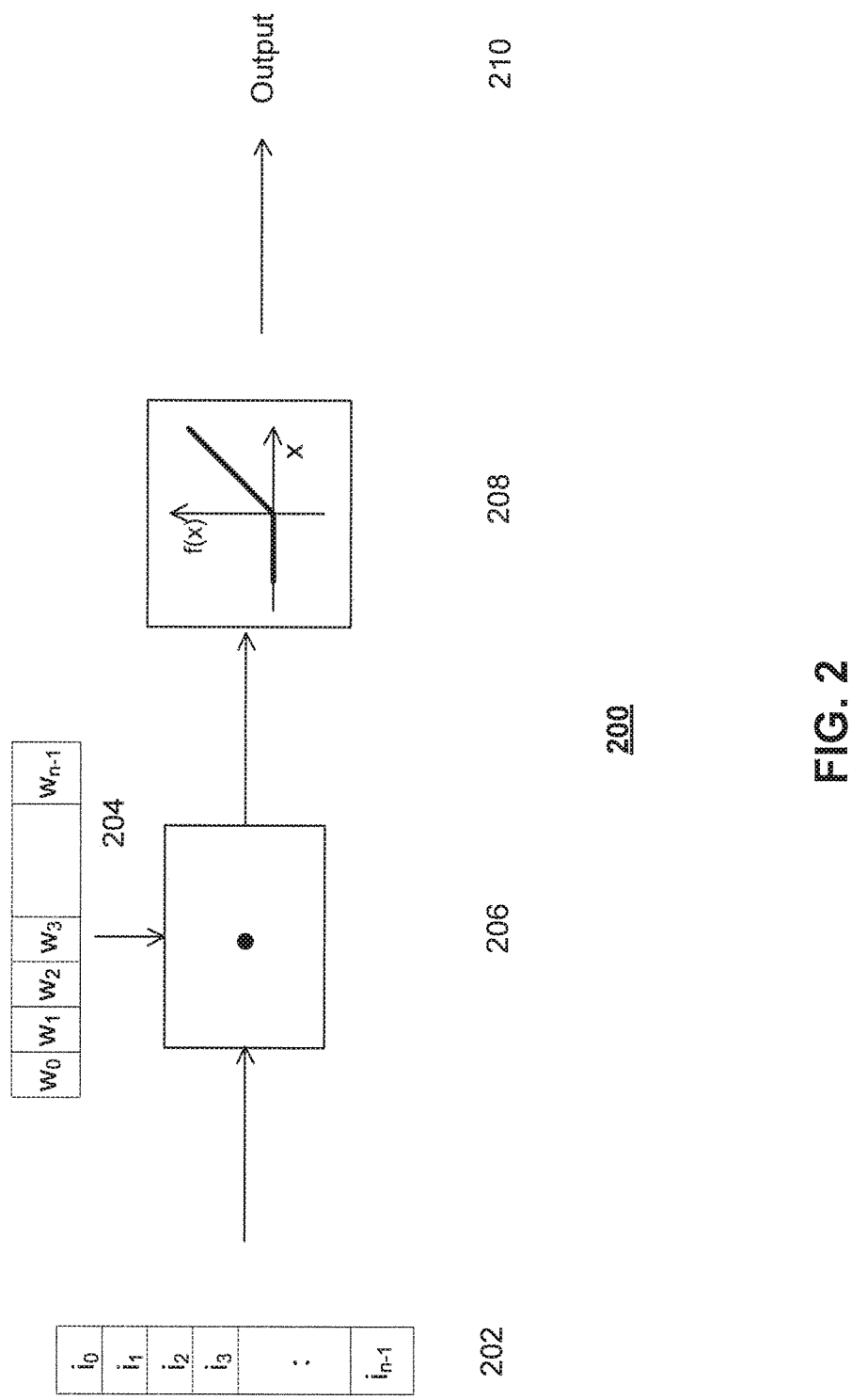
FIG. 2 illustrates a schematic diagram of an exemplary activation function of a neural network, according to some embodiments of the disclosure.

FIG. 2 illustrates a schematic diagram of an activation function 200 of a neural network, according to some embodiments of the disclosure. Activation function 200 can involve one or more functional units, such as a dot product unit 206 and a rectified linear unit 208. The one or more functional units can be implemented by components of architecture 100. For example, dot product unit 206 and rectified linear unit 208 can be implemented by cores 1024. It is appreciated that a neural network can include more than one activation function.

As shown in FIG. 2, dot product unit 206 receives an input vector 202 having N input elements ($i_0, i_1, i_2, \ldots,$ and $i_{n-1}$) and a weight vector 204 includes N weight elements ($w_0, w_1, w_2, \ldots, w_{n-1}$) corresponding to input vector 202. Dot product unit 206 can then perform a full vector-vector multiplication on input vector 202 and weight vector 204 to generate a dot product. It is appreciated that a neural network can include a weight vector having a plurality of weight elements, which were generated during training.

Dot production on two vectors, each having a length of N components, can be performed based on equation 1 below.

$$I \cdot W = \sum_{k=0}^{n-1} i_k w_k = i_0 w_0 + i_1 w_1 + i_2 w_2 + \ldots + i_{n-1} w_{n-1} \quad \text{Equation 1}$$

As shown in above Equation 1, the dot production of input vector 202 and weight vector 204 requires n multiplications and n−1 additions.

The dot product can be further sent to rectified linear unit 208 for processing. Rectified linear unit 208 can function as a rectifier, which is configured to generate an output 210 corresponding to input vector 202 based on the dot product. Output 210 can be a final output of the neural network, or an input for a next activation function. Output 210 can be generated based on equation 2 below.

$$f(x) = \begin{cases} x & \text{if } x > 0 \\ 0 & \text{otherweise} \end{cases} \quad \text{Equation 2}$$

In the above equation, f(x) represents output 210, and x represents the dot product. Therefore, when the dot product is greater than 0, output 210 is equal to the dot product. And when the dot product is less than or equal to 0, output 210 is 0. In other words, rectified linear unit 208 can filter out a portion of input vectors and dot products thereof. It is appreciated that rectified linear unit 208 can function according to an equation different from Equation 2 above. For example, an offset can be further added to the dot product to generate the output.

As it can be seen from the above description, when a dot product of an input vector is less than or equal to 0, resources (e.g., computation resources for n multiplications and n−1 additions) spent on calculating the dot product are wasted. Thus, if a value of a dot product can be estimated beforehand, the waste of computational resources can be avoided.

Figure 3A:
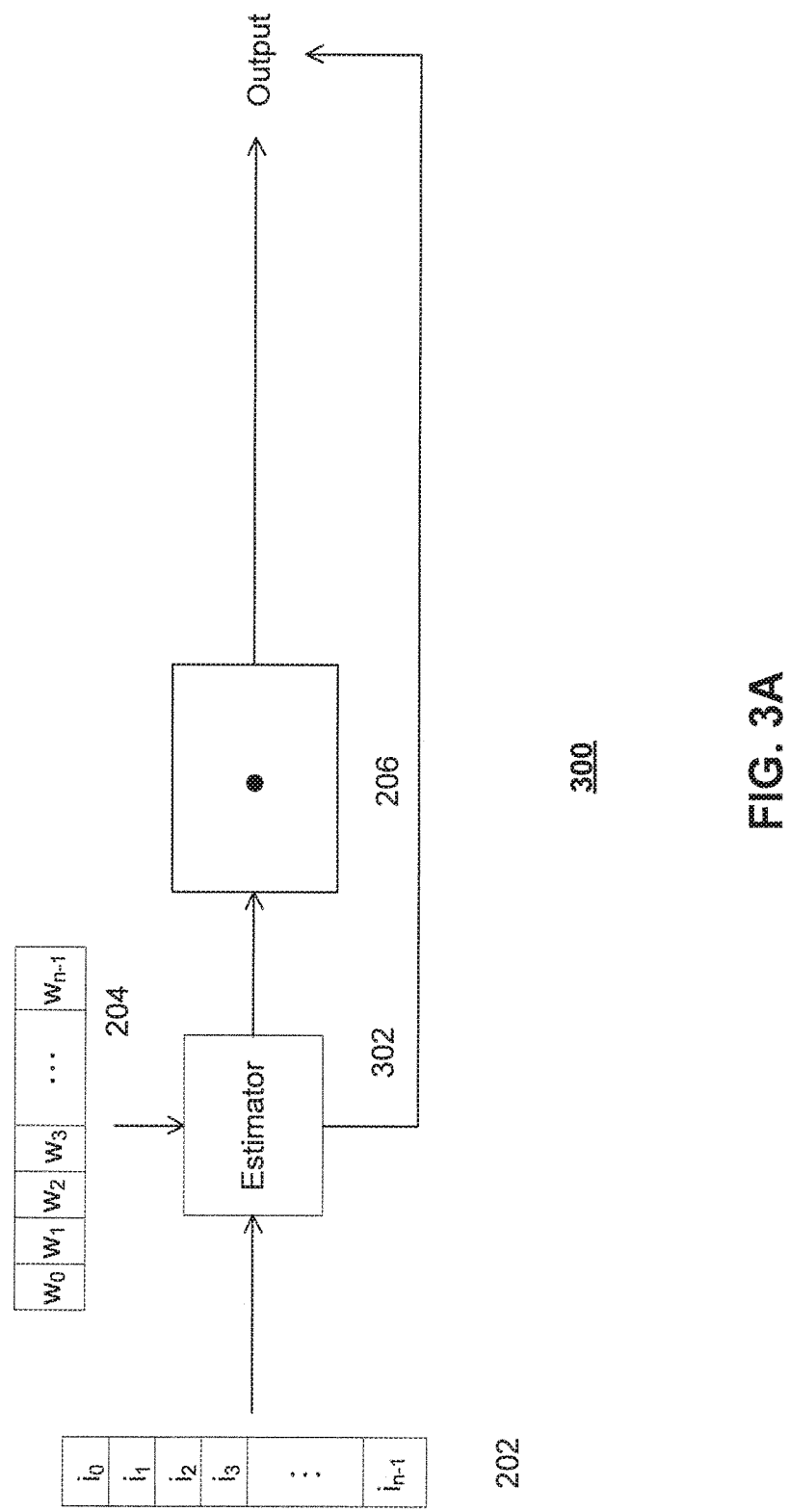
FIG. 3A illustrates a schematic diagram of another exemplary activation function of a neural network, according to some embodiments of the disclosure.

FIG. 3A illustrates a schematic diagram of an activation function 300 of a neural network, according to embodiments of the disclosure.

Compared to activation function 200, activation function 300 of FIG. 3A further provides an estimator 302 before performing the full vector-vector multiplication to generate a dot product.

As shown in FIG. 3A, estimator 302 can receive a plurality of input vectors of input data. For a convolutional neural network, as an example, the plurality of input vectors can be columns or rows of a feature map. Among the plurality of input vectors, estimator 302 can generate an estimation value associated with an input vector based on a weight vector of the neural network.

Figure 3B:
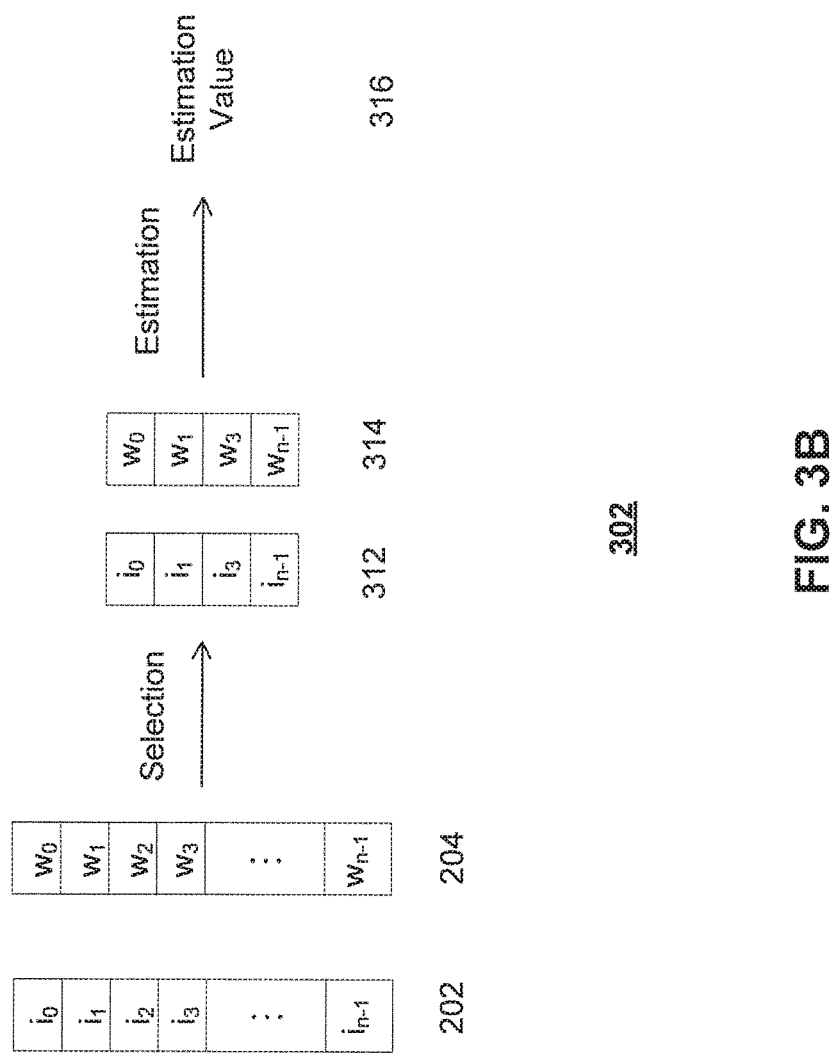
FIG. 3B illustrates a schematic diagram of generating an estimation value by an estimator, according to some embodiments of the disclosure.

FIG. 3B further illustrates a schematic diagram of generating an estimation value by estimator 302, according to some embodiments of the disclosure.

Estimator 302 can select a subset of weight vector and a corresponding subset of input vector to determine the estimation value. As shown in FIG. 3B, input vector 202 having N input elements ($i_0, i_1, i_2, \ldots,$ and $i_{n-1}$) and weight vector 204 having weight elements ($w_0, w_1, w_2, \ldots, w_{0-1}$) are being processed by estimator 302. Because a possibility of a true estimation associated with a vector is in proportion to a scalar projection of the vector, larger absolute values can generate better estimation. Therefore, in some embodiments, the selected subset of weight elements includes the largest absolute values in a weight vector. For example, a subset 314 including $w_0$, $w_1$, $w_3$, and $w_{n-1}$ has the largest four absolute values from the weights of weight vector 204. It is appreciated that a number of the selected subset of weight elements can be determined differently according to different neural networks. For example, for a different neural network, five elements having the largest absolute values can be selected by estimator 302.

Estimator 302 can further determine a subset of input elements of input vector 202 corresponding to the selected subset of weight elements. In some embodiments, the subset of input elements can be determined according to positions of the selected subset of weight elements. For example, a subset 312 including $i_0$, $i_1$, $i_3$, and $i_{n-1}$ can be determined according to positions of selected subset 314 including $w_0$, $w_1$, $w_3$, and $w_{n-1}$. In some embodiments, the positions of the selected weight elements and determined input elements may not be identical. For example, an offset can be added to positions of the selected weight elements to determine the input elements. In the above example, a number of the selected subset of weight elements is equal to a number of the determined subset of input elements.

Then, estimator 302 can determine an estimation value 316 based on the subset of weight elements and the subset of input elements. Estimation value 316 can be an arithmetic result based on the subset of weight elements and the subset of input elements. The estimation value can be associated with a possibility of a dot product being positive. In some embodiments, estimator 302 can perform vector-vector multiplication on the subset of weight elements and the subset of input elements to determine a dot product as the estimation value associated with the input vector.

It is appreciated that determining the estimation value consumes much less computational resources than the full vector-vector multiplication as described in FIG. 2. For example, estimation value 316 is determined by performing vector-vector multiplication on a small subset of values, in this case, on $w_0$, $w_1$, $w_3$, and $w_{n-1}$ and $i_0$, $i_1$, $i_3$, and $i_{n-1}$ to generate a sum of $w_0 i_0$, $w_1 i_1$, $w_3 i_3$, and $w_{n-1} i_{n-1}$, which merely takes four multiplications and three additions.

Estimator 302 can further determine whether the estimation value associated with the input vector is less than a given threshold. For example, when the estimation value is greater than or equal to the given threshold, it can indicate that it is very likely the dot product associated with the input vector is positive and can be used as the output. Otherwise, when the estimation value is less than the given threshold, it is indicated that it is very likely the dot product associated with the input vector can be set to zero by a rectifier.

Thus, in response to the estimation value being less than the given threshold, estimator 302 can set the output to zero. In other words, no full vector-vector multiplication is further needed for this input vector, and the activation for this input vector is dropped out. Therefore, when the estimation value is less than the given threshold, much less computation resources are utilized.

It is appreciated that an estimation may not always be correct. For example, the actual dot product of the input vector and the weight vector could in fact be positive when the determined estimation value is less than the given threshold. In this case, the estimation can cause the neural network to be less accurate. It is further appreciated that that the threshold and number of inputs of each subset can be configured for balancing the accuracy of the neural network with the savings of computational resources.

In response to the estimation value being greater than or equal to the given threshold, estimator 302 can send full-scale input vector 202 and weight vector 204 to dot product unit 206 to generate a dot product as the output.

It is appreciated that, in some embodiments, it may not be necessary to perform the full vector-vector multiplication on input vector 202 and weight vector 204, as estimation value 316 (i.e., the sum of $w_0 i_0$, $w_1 i_1$, $w_3 i_3$, and $w_{n-1} i_{n-1}$) can be reused. For example, in addition to estimation value 316, dot product unit 206 can further calculate a sum of $w_2 i_2$, $w_4 i_4$, . . . , and $w_{n-2} i_{n-2}$, and further determine the output of activation function 300 by adding estimation value 316 and the sum of $w_2 i_2$, $w_4 i_4$, . . . , and $w_{n-2} i_{n-2}$. Therefore, when the estimation value is greater than or equal to the given threshold, no additional computation resources are needed compared with activation function 200. Thus, activation function 300 can achieve a relatively accurate output with much less computation.

Figure 4:
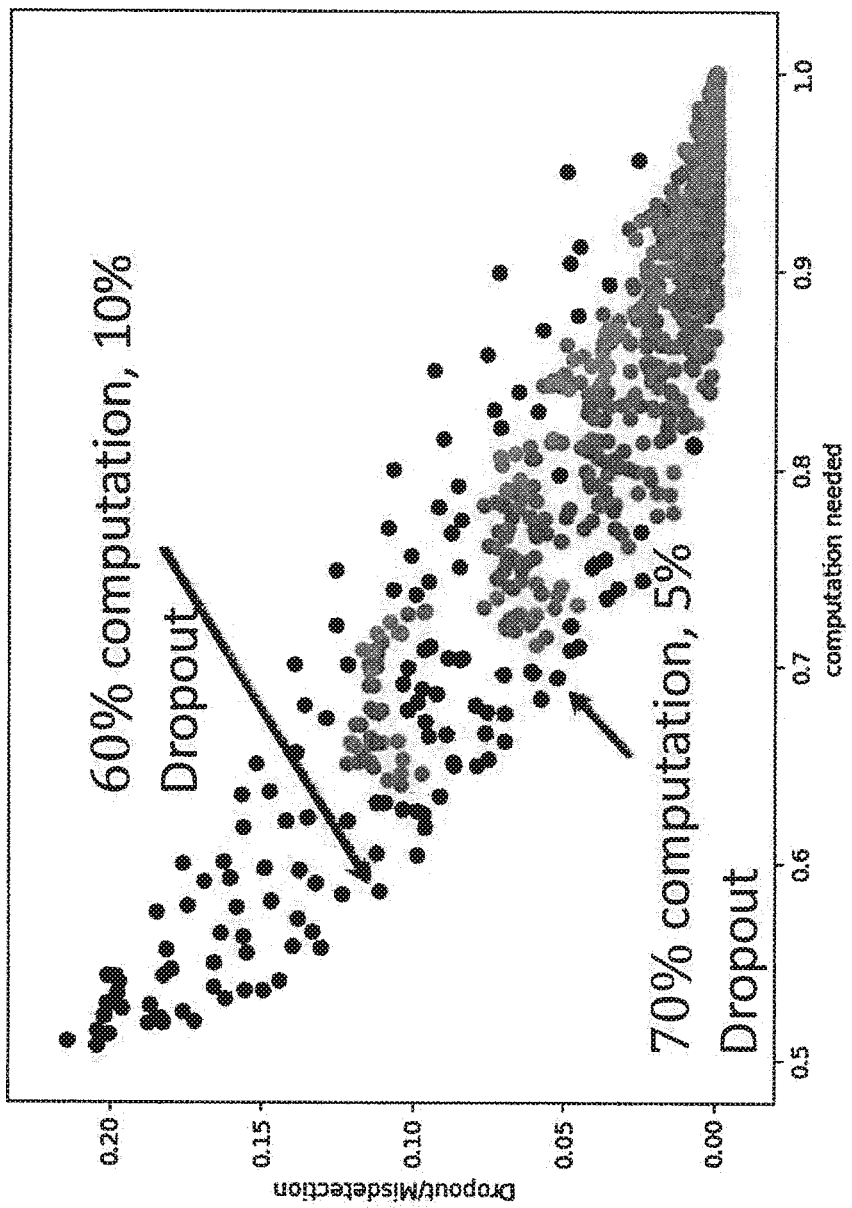
FIG. 4 illustrates a dot plot showing relations between a dropout rate of activation functions and computation needed, according to some embodiments of the disclosure.

FIG. 4 illustrates a dot plot showing relations between a dropout rate of activation functions and computation needed, according to embodiments of the disclosure. As shown in FIG. 4, for a certain threshold used for the estimation value, when 10% of the activations are dropped out, activation function 300 uses only 60% of the computational resources for activation function 200. For an exemplary wide residual network (e.g., wide-resnet-28), when none of the activations are dropped out, the accuracy for the result of neural network is 81.04%. When 10% of the activations is dropped out, the accuracy for the result of neural network is 80%. In other words, applying activation function 300 with a certain threshold can save 40% of computation with a performance degradation of 1.04%.

Figure 5:
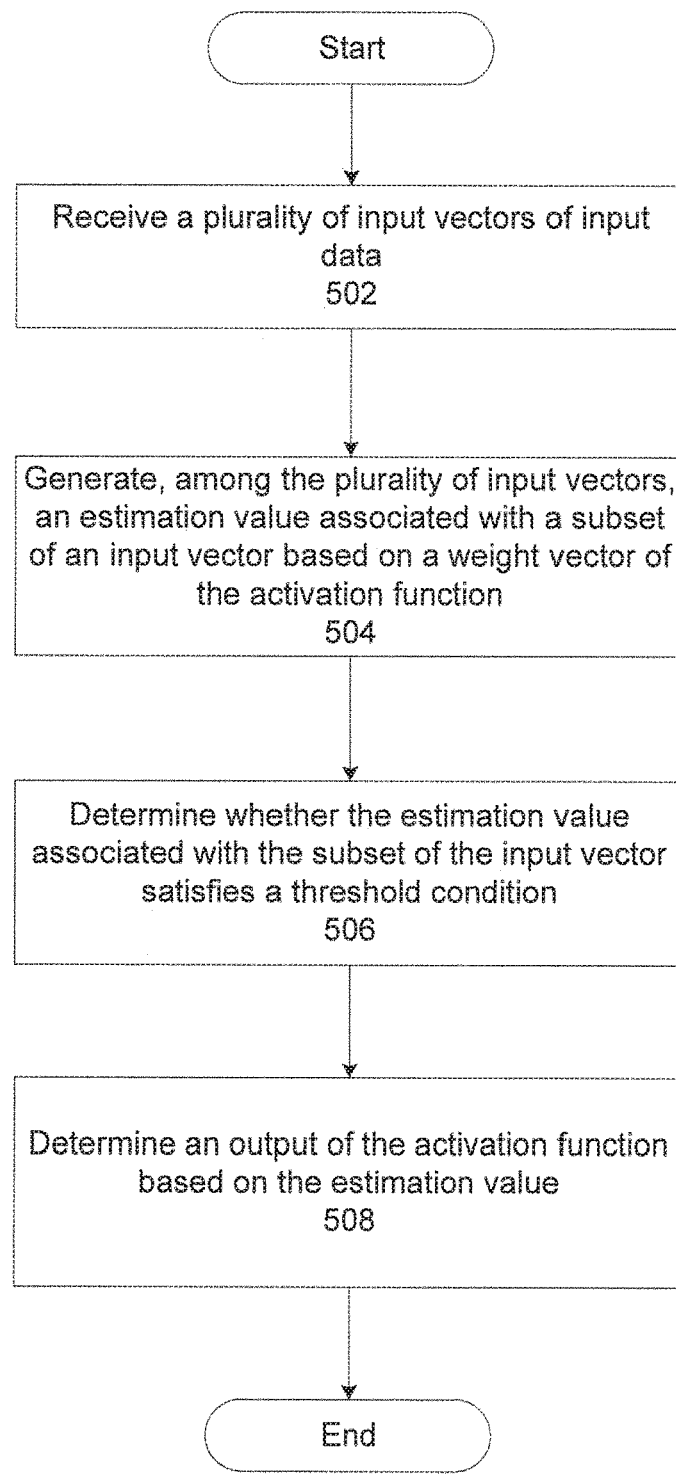
FIG. 5 is a flowchart of an exemplary computer-implemented method for executing an activation function of a neural network, according to some embodiments of the disclosure.

FIG. 5 is a flowchart of an exemplary computer-implemented method 500 for executing an activation function of a neural network, according to some embodiments of the disclosure. As discussed above, the neural network can be any neural network that requires vector-vector multiplication and a rectifier for rectifying dot products of the vector-vector multiplication. For example, the neural network can be a convolutional neural network (CNN), deep neural network (DNN), multilayer perceptron (MLP), a recurrent neural network (RNN) and the like. The activation function can respond to an input and generate a result. It is appreciated that the neural network can include more than one activation function, and a result of a first activation function can be used as an input for a second activation function. Method 500 can be executed by architecture 100 of FIG. 1A. Referring to FIG. 5, method 500 may include the following steps.

At step 502, a plurality of input vectors of input data can be received. The input data can be text, audio signals, images, and the like. In some embodiments, the input data can also be a feature map.

At step 504, among the plurality of input vector, an estimation value associated with a subset of an input vector can be generated based on a weight vector of the activation function. It is appreciated that the weight vector of the neural network can include a plurality of weight elements, which are generated during the training of the neural network. The weight vector can be comprised of a first subset of weight elements and a second subset of weight elements, the input vector can be comprised of a first subset of input elements and a second subset of input elements.

The first subset of weight elements can include a number of weight elements having largest absolute values, and the first subset of input vectors can correspond to the first subset of weight elements. For example, the first subset of input vectors can be determined in association with positions of the selected subset of weight elements. Accordingly, a size of the first subset of weight elements can be equal to a size of the first subset of weight elements. For example, as shown above in FIG. 3B, a subset 314 of a weight vector 204 can include four largest absolute values of $w_0$, $w_1$, $w_3$, and $w_{n-1}$, a subset 312 of an input vector 202 can be determined according to subset 314 and sizes of subset 312 and subset 314 are the same.

The estimation value associated with the input vector can be determined based on the first subset of weight elements and the first subset of input vectors. In other words, the neural network can select a given number of weight elements having the largest absolute weight values and input vectors corresponding to the selected weight elements.

In some embodiments, determining the estimation value based on the first subset of weight elements and the first subset of input vectors can include performing a dot production on the first subset of weight elements and the first subset of input vectors to generate a first dot product as the estimation value.

At step 506, whether the estimation value associated with the subset of the input vector satisfies a threshold condition can be determined. The threshold condition can include the estimation value associated with the input vector being greater than or equal to a threshold. The threshold can be an empirical value determined based on a type of the neural network during practical application. If the estimation value does not satisfy the threshold condition (e.g., the estimation value being less than the threshold), the neural network can assume that a dot product of the input vector and the weight vector is not positive and cannot pass a rectified linear unit. Otherwise, the neural network can assume the dot product of the input vector and the weight vector is positive and can be used as the output of the activation function.

At step 508, accordingly, an output of the activation function can be determined based on the estimation value.

In response to the estimation value associated with the subset of the input vector not satisfying the threshold condition, the neural network can set the output of the activation function as zero, and no further computation is needed for the input vector.

In response to the estimation value associated with the subset of the input vector satisfying the threshold, the neural network can determine the output by performing a dot production on the input vector and the weight vector.

In some embodiments, the neural network can perform the dot production on the second subset of weight elements and the second subset of input elements to generate a second dot product, and generate the output by adding the estimation value and the second dot product. Because the estimation value is generated by performing the dot production on the first subset of weight elements and the first subset of input vectors, part of the full-scale dot production on the input vector and the weight vector has been performed and can be reused to save computational resources.

In some embodiments, method 500 can further include determining estimation values for each of the plurality of input vectors, determining dot products of the plurality of input vectors and the weight vector based on the estimation values, and generating a result of the neural network based on the dot products.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a processor storage (e.g., host memory 104), a semiconductor storage device, or any suitable combination of the foregoing. A non-transitory computer readable medium may be provided that stores instructions to carry out the embodiments described above. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a ROM, a PROM, and EPROM, a FLASH-EPROM or any other flash memory, NVRAM, a cache, a register, any other memory chip or cartridge, and networked versions of the same.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a computer, or other programmable data processing apparatus to produce a machine, such that the instructions, which execute via the processor of the computer or other programmable data processing apparatus, create means for implementing the above-described methods.

The embodiments may further be described using the following clauses:

1. A computer-implemented method for executing an activation function of a neural network, comprising:
receiving a plurality of input vectors of input data;
generating, among the plurality of input vectors, an estimation value associated with a subset of an input vector based on a weight vector of the activation function;
determining whether the estimation value associated with the subset of the input vector satisfies a threshold condition; and
determining an output of the activation function based on the estimation value.

2. The method according to clause 1, wherein determining the output of the activation function based on the estimation value further comprises:
in response to the estimation value not satisfying the threshold condition, setting the output to zero; or
in response to the estimation value satisfying the threshold condition, determining the output by performing a dot production on the input vector and the weight vector.

3. The method according to clause 1 or 2, wherein the weight vector is comprised of a first subset of weight elements and a second subset of weight elements, the input vector is comprised of a first subset of input elements and a second subset of input elements, and generating the estimation value associated with the subset of the input vector based on the weight vector of the activation function further comprises:

determining the estimation value based on the first subset of weight elements and the first subset of input elements, wherein the first subset of input elements corresponds to the first subset of weight elements.

4. The method according to clause 3, wherein determining the estimation value based on the first subset of weight elements and the first subset of input elements further comprises:

performing a dot production on the first subset of weight elements and the first subset of input elements to generate a first dot product as the estimation value.

5. The method according to clause 3 or 4, wherein the first subset of weight elements comprises a number of largest absolute weight values of the weight vector.

6. The method according to any one of clauses 3-5, wherein a size of the first subset of weight elements is equal to a size of the first subset of input elements.

7. The method according to any one of clauses 4-6, wherein determining the output by performing the dot production on the input vector and the weight vector comprises:

performing the dot production on the second subset of weight elements and the second subset of input elements to generate a second dot product; and generate the output by adding the estimation value and the second dot product.

8. The method according to any one of clauses 1-7, further comprising:

determining estimation values for each of the plurality of input vectors;

determining dot products of the plurality of input vectors and the weight vector based on the estimation values; and generating a result of the neural network based on the dot products.

9. The method according to any one of clauses 1-8, wherein the threshold condition comprises the estimation value associated with the input vector being greater than or equal to a threshold.

10. The method according to clause 9, wherein the threshold of the threshold condition is determined based on a type of the neural network.

11. A system for executing a neural network, comprising:
a memory storing a set of instructions; and
at least one processor configured to execute the set of instructions to cause the system to perform:
receiving a plurality of input vectors of input data;
generating, among the plurality of input vectors, an estimation value associated with a subset of an input vector based on a weight vector of the activation function;
determining whether the estimation value associated with the subset of the input vector satisfies a threshold condition; and
determining an output of the activation function based on the estimation value.

12. The system according to clause 11, wherein determining the output of the activation function based on the estimation value further comprises:

in response to the estimation value not satisfying the threshold condition, setting the output to zero; or in response to the estimation value satisfying the threshold condition, determining the output by performing a dot production on the input vector and the weight vector.

13. The system according to clause 11 or 12, wherein the weight vector is comprised of a first subset of weight elements and a second subset of weight elements, the input vector is comprised of a first subset of input elements and a second subset of input elements, and generating the estimation value associated with the subset of the input vector based on the weight vector of the activation function further comprises:

determining the estimation value based on the first subset of weight elements and the first subset of input elements, wherein the first subset of input elements corresponds to the first subset of weight elements.

14. The system according to clause 13, wherein determining the estimation value based on the first subset of weight elements and the first subset of input elements further comprises:

performing a dot production on the first subset of weight elements and the first subset of input elements to generate a first dot product as the estimation value.

15. The system according to clause 13 or 14, wherein the first subset of weight elements comprises a number of largest absolute weight values of the weight vector.

16. The system according to any one of clauses 13-15, wherein a size of the first subset of weight elements is equal to a size of the first subset of input elements.

17. The system according to any one of clauses 14-16, wherein determining the output by performing the dot production on the input vector and the weight vector comprises:

performing the dot production on the second subset of weight elements and the second subset of input elements to generate a second dot product; and generate the output by adding the estimation value and the second dot product.

18. The system according to any one of clauses 11-17, wherein the set of instructions is further executed to cause the system to perform:

determining estimation values for each of the plurality of input vectors;

determining dot products of the plurality of input vectors and the weight vector based on the estimation values; and generating a result of the neural network based on the dot products.

19. The system according to any one of clauses 11-18, wherein the threshold condition comprises the estimation value associated with the input vector being greater than or equal to a threshold.

20. A non-transitory computer readable medium that stores a set of instructions that is executable by at least one processor of a computer system to cause the computer system to perform a method for executing an activation function of a neural network, the method comprising:

receiving a plurality of input vectors of input data;
generating, among the plurality of input vectors, an estimation value associated with a subset of an input vector based on a weight vector of the activation function;
determining whether the estimation value associated with the subset of the input vector satisfies a threshold condition; and
determining an output of the activation function based on the estimation value.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C.

Although the specification has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computer-implemented method for executing an activation function of a neural network, comprising:
    receiving a plurality of input vectors of input data;
    generating, among the plurality of input vectors, an estimation value associated with a subset of an input vector based on a weight vector of the activation function;
    determining whether the estimation value associated with the subset of the input vector satisfies a threshold condition; and
    determining an output of the activation function based on the estimation value.

2. The method according to claim 1, wherein determining the output of the activation function based on the estimation value further comprises:
    in response to the estimation value not satisfying the threshold condition, setting the output to zero; or
    in response to the estimation value satisfying the threshold condition, determining the output by performing a dot production on the input vector and the weight vector.

3. The method according to claim 1, wherein the weight vector is comprised of a first subset of weight elements and a second subset of weight elements, the input vector is comprised of a first subset of input elements and a second subset of input elements, and generating the estimation value associated with the subset of the input vector based on the weight vector of the activation function further comprises:
    determining the estimation value based on the first subset of weight elements and the first subset of input elements, wherein the first subset of input elements corresponds to the first subset of weight elements.

4. The method according to claim 3, wherein determining the estimation value based on the first subset of weight elements and the first subset of input elements further comprises:
    performing a dot production on the first subset of weight elements and the first subset of input elements to generate a first dot product as the estimation value.

5. The method according to claim 3, wherein the first subset of weight elements comprises a number of largest absolute weight values of the weight vector.

6. The method according to claim 3, wherein a size of the first subset of weight elements is equal to a size of the first subset of input elements.

7. The method according to claim 4, wherein determining the output by performing the dot production on the input vector and the weight vector comprises:
    performing the dot production on the second subset of weight elements and the second subset of input elements to generate a second dot product; and
    generate the output by adding the estimation value and the second dot product.

8. The method according to claim 1, further comprising:
    determining estimation values for each of the plurality of input vectors;
    determining dot products of the plurality of input vectors and the weight vector based on the estimation values; and
    generating a result of the neural network based on the dot products.

9. The method according to claim 1, wherein the threshold condition comprises the estimation value associated with the input vector being greater than or equal to a threshold.

10. The method according to claim 9, wherein the threshold of the threshold condition is determined based on a type of the neural network.

11. A system for executing a neural network, comprising:
    a memory storing a set of instructions; and
    at least one processor configured to execute the set of instructions to cause the system to perform:
        receiving a plurality of input vectors of input data;
        generating, among the plurality of input vectors, an estimation value associated with a subset of an input vector based on a weight vector of the activation function;
        determining whether the estimation value associated with the subset of the input vector satisfies a threshold condition; and
        determining an output of the activation function based on the estimation value.

12. The system according to claim 11, wherein determining the output of the activation function based on the estimation value further comprises:
in response to the estimation value not satisfying the threshold condition, setting the output to zero; or
in response to the estimation value satisfying the threshold condition, determining the output by performing a dot production on the input vector and the weight vector.

13. The system according to claim 11, wherein the weight vector is comprised of a first subset of weight elements and a second subset of weight elements, the input vector is comprised of a first subset of input elements and a second subset of input elements, and generating the estimation value associated with the subset of the input vector based on the weight vector of the activation function further comprises:
determining the estimation value based on the first subset of weight elements and the first subset of input elements, wherein the first subset of input elements corresponds to the first subset of weight elements.

14. The system according to claim 13, wherein determining the estimation value based on the first subset of weight elements and the first subset of input elements further comprises:
performing a dot production on the first subset of weight elements and the first subset of input elements to generate a first dot product as the estimation value.

15. The system according to claim 13, wherein the first subset of weight elements comprises a number of largest absolute weight values of the weight vector.

16. The system according to claim 13, wherein a size of the first subset of weight elements is equal to a size of the first subset of input elements.

17. The system according to claim 14, wherein determining the output by performing the dot production on the input vector and the weight vector comprises:
performing the dot production on the second subset of weight elements and the second subset of input elements to generate a second dot product; and
generate the output by adding the estimation value and the second dot product.

18. The system according to claim 11, wherein the set of instructions is further executed to cause the system to perform:
determining estimation values for each of the plurality of input vectors;
determining dot products of the plurality of input vectors and the weight vector based on the estimation values; and
generating a result of the neural network based on the dot products.

19. The system according to claim 11, wherein the threshold condition comprises the estimation value associated with the input vector being greater than or equal to a threshold.

20. A non-transitory computer readable medium that stores a set of instructions that is executable by at least one processor of a computer system to cause the computer system to perform a method for executing an activation function of a neural network, the method comprising:
receiving a plurality of input vectors of input data;
generating, among the plurality of input vectors, an estimation value associated with a subset of an input vector based on a weight vector of the activation function;
determining whether the estimation value associated with the subset of the input vector satisfies a threshold condition; and
determining an output of the activation function based on the estimation value.

\* \* \* \* \*